March 22, 1927.
M. B. SAMPLE
1,621,642
BEAN AND PEA HARVESTER
Filed July 1, 1925
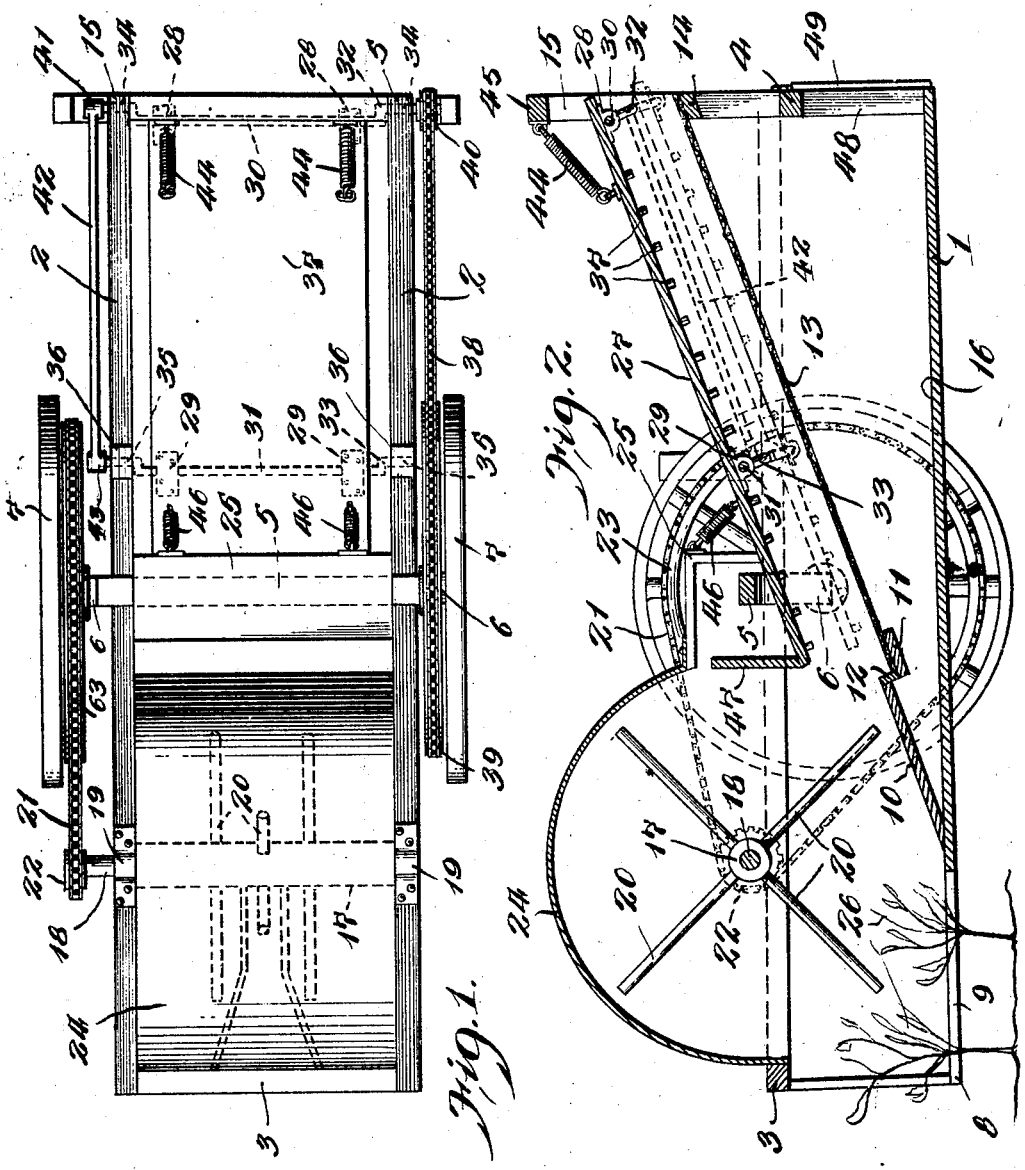
INVENTOR
Milton B. Sample,
BY
ATTORNEYS Patented Mar. 22, 1927.

1,621,642

UNITED STATES PATENT OFFICE.

MILTON B. SAMPLE, OF ELIZABETH CITY, NORTH CAROLINA.

BEAN AND PEA HARVESTER.

Application filed July 1, 1925. Serial No. 40,919.

My invention relates to improvements in bean and pea harvesters, and it consists in the combinations, constructions and arrangements herein described and claimed.

An object of the invention is the provision of a bean and pea harvester of simple construction which affords facilities for harvesting beans or peas from vines in the field and for separating the beans or peas from the hulls and chaff.

A further object of the invention is the provision in a harvester of the character described of a novel movable thresher plate and riddle arrangement for separating beans or peas from the chaff and refuse and for discharging the chaff and refuse from the device.

A still further object of the invention is the provision in a device of the character described of novel means for making use of power derived from rotating ground wheels of the device to operate the movable harvesting and threshing parts of the device.

Other objects and advantages of the invention will be apparent from the following description, considered in conjunction with the accompanying drawings, in which—

Figure 1 is a plan view of the improved harvester, and

Figure 2 is a longitudinal vertical section through the harvester.

In carrying out the invention, I make use of a box-like body having a bottom 1, a pair of side walls 2, a front end 3 and a rear end 4. An arched axle 5 has end portions 6 supported in alined bearings in the sides of the body. The ends of the axle 5 extend laterally of opposite sides of the body of the device and are supported in the hubs of ground wheels 7, whereby the body is movably supported.

The body of the device is provided with a cut-out 8 which extends through the lower part of the front end 3 of the body and then rearwardly in the bottom as indicated at 9, along the longitudinal median line of the latter. The portion 9 of the cut-out decreases in width for part of the distance from the entrance to this cut-out to its rearward end and is of uniform width for the remainder of its length. This cut-out 8—9 forms a guideway for a purpose to be presently described.

An inclined supporting plate 10 is supported at its front edge on the bottom 1 adjacent to the rearward end of the guide way 8—9 and extends transversely of the body between the side walls 2, the rearward end portion of the supporting plate 10 being offset downwardly at 11, thus producing a transverse rearwardly facing shoulder 12 at the juncture of the portion 11 with the remaining portion of the supporting plate. The rearward end of the supporting plate is located considerably below the level of the upper edge of the body of the device.

A coarse meshed screen or riddle 13, which extends the full width of the body of the device, is supported at its forward end on the downwardly offset portion 11 of the supporting plate 10 and is supported at its rearward end on a cross bar 14 which extends between a pair of uprights 15 on the rear end 4 of the body of the device. A compartment, indicated at 16, thus is defined within the body of the device rearwardly of and beneath the supporting plate 10 and riddle 13.

A beater comprises a hub 17 which is secured on a transverse shaft 18 that is journalled adjacent to its opposite ends in bearings 19 at the upper edges of the sides 2, the hub carrying radially extending beater arms 20. The shaft 18 extends across the body of the device almost directly above the rearward end of the guide way 8—9 and the arms 20 are of sufficient length to move close to the plane of the portion 9 of the guide way and close to the supporting plate 10 when the beater is rotated counter-clockwise or in other words in the direction of rotation of the wheels 7 of the device when the latter is propelled or drawn in a forward direction. This is accomplished by training a chain 21 about a sprocket 22, which is secured on an extending end portion of the shaft 18, and about a sprocket 23 that is secured to and is concentric with one of the wheels 7.

A hood 24 covers the beater and is secured at its forward edge to the front end 3 of the body of the device and at its rearward end to the horizontal arm of a right angular frame member 25 which extends transversely of the body of the device above the forward end portion of the riddle 13 between the sides 2 of the body.

The guide way 8—9 is adapted to guide the branches of plants 26 standing in the field to position in the body of the device to be struck by the beater arms as the device moves forward. The rotating beater will knock and sweep the pods of beans, peas or the like from the plants rearwardly over the supporting plate 10 onto the inclined screen 13 and between the latter and a rotary inclined thresher plate 27. The latter has a pair of alined transversely spaced bearings 28 on its under face adjacent to its rearward end and a pair of alined transversely spaced bearings 29 on its under side forwardly of the transverse median line of the thresher plate. The cranks 30 and 31 of crank shafts 32 and 33, respectively, are journaled in the pairs of bearings 28—28 and 29—29, respectively. The crank shaft 32 is journalled in horizontally alined bearings at 34 in the uprights 15 and the crank shaft 33 is journalled in horizontally alined bearings 35 in supporting blocks 36 on the upper edges of the sides 2 of the body of the device. The thresher plate 27 is provided with short spikes or projections 37 which depend from the under face of the thresher plate and are moved downward close to the screen 13 and then rearwardly and upwardly in a path extending in a circle about an axis parallel to the axes of rotation of the crank shafts 33 and 32 when the crank shafts are rotated in synchronism in an anti-clockwise direction. A chain 38 establishes a driving connection between a sprocket 39, which is secured to the second wheel 7 concentric with the latter, and a sprocket 40, which is secured on an extending end portion of the rear crank shaft 32. The opposite end portion of the crank shaft 32 is pivotally connected at 41 to a crank equalizer or connecting rod 42 which is pivotally connected at 43 to the corresponding end portion of the crank shaft 33, whereby the crank shafts 32 and 33 will be rotated in unison in an anti-clockwise direction when the device is moved forward on the ground wheels 7. A tension spring 44 extends between the rearward end portion of the thresher plate 27 and a cross bar 45 which spans the upper ends of the uprights 15. The spring 44 urges the thresher plate 27 rearwardly and upwardly. A tension spring 46 is secured at its lower end to the thresher plate 27 forwardly of the transverse median line of the thresher plate and at its upper end to the frame member 25. The spring 46 tends to draw the thresher plate 27 forwardly and upwardly. Play between the thresher plate and the crank shafts on which the thresher plate is supported thus is prevented and rattling or undue noise resulting from the operation of the thresher plate are obviated.

An upstanding shield or baffle 47 is provided at the forward edge of the thresher plate 27. Any pods which may be cast rearwardly and upwardly above the level of the forward end of the thresher plate will strike the shield 47 and then fall downward onto the forward end portion of the screen 13.

From the foregoing description of the various parts of the device, the operation thereof may be readily understood. The device is drawn or otherwise moved in a field along a row of beans, peas or like plants so that the branches of the plants will enter the guideway and will be struck by the arms of the rotating beater. The pods will be projected rearwardly over the inclined supporting plate 10 onto the screen 13 and the shoulder 12 will prevent return movement of the pods from the screen 13 to the supporting plate 10. The space between the screen 13 and the thresher plate 27 constitutes a threshing passage. As the device moves forward on the ground wheels, the crank shafts which support the thresher plate will be rotated about horizontal axes and the thresher plate will likewise be swung about a horizontal axis in a circular path which approaches the upper face of the screen 13. The peas or beans which are on the screen 13 will be threshed between the spiked lower face of the thresher plate and the screen and will fall through the apertures in the screen into the chamber 16. The latter is provided with an outlet opening 48 at the rearward end of the body of the device and this outlet opening may be closed normally by a hinged door 49 which can be opened when desired to permit removal of the peas or beans from the compartment 16. The hulls and other refuse will be moved rearwardly on the screen 13 by the depending spikes on the moving thresher plate and will be discharged at the rearward end of the device from the space between the thresher plate and the screen 13.

Obviously, the invention is susceptible of embodiment in forms other than that which is illustrated in the accompanying drawings and I therefore consider as my own all such modifications and adaptations thereof as fairly fall within the scope of the appended claims.

I claim:

1. In a harvester of the character described, a vehicle having a body provided with a guide way in its forward end, a rotary beater supported above said guide way for stripping pods from bean or pea plants entering said guide way as said vehicle moves forward, a screen supported rearwardly of said guideway in position to receive pods from said beater, and a thresher plate movable close to said screen for cooperating with the latter to thresh the beans or peas from said pods and to discharge the chaff and hulls from said vehicle, said screen and said thresher plate being inclined upwardly toward their rearward ends and the supporting means for said screen being formed to provide a rearwardly facing rigid shoulder at the forward end of the screen.

2. In a device of the character described, a vehicle having a body, an axle carried by said body, ground wheels supporting said axle and body, said body having a guide way in its forward end portion extending rearwardly in the bottom of the body, a beater supported above said guideway for rotation about a horizontal axis, a rearwardly and upwardly inclined supporting plate secured on the bottom of the body at the rearward end of the guideway, a screen extending from the rearward end of the supporting plate rearwardly of the body, said screen being inclined upward toward its rearward end, a pair of spaced transverse crank shafts rotatably supported on said body above said screen and adjacent thereto, a thresher plate having spaced bearings in which the cranks of said crank shafts are journalled, whereby said plate will be swung in a circular path approaching close to the upper face of said screen when the crank shafts are rotated, said thresher plate having substantially the same area as said screen, projections on the lower face of said threshes plate, motion transmission means connecting said crank shafts to rotate in unison, and other motion transmission means connecting one of said crank shafts with one of said ground wheels.

3. In a device of the character described, a vehicle having a body, an axle carried by said body, ground wheels supporting said axle and body, said body having a guide way in its forward end portion extending rearwardly in the bottom of the body, a beater supported above said guide way for rotation about a horizontal axis, a rearwardly and upwardly inclined supporting plate secured on the bottom of the body at the rearward end of the guideway, a screen extending from the rearward end of the supporting plate rearwardly of the body, said screen being inclined upward toward its rearward end, a pair of spaced transverse crank shafts rotatably supported on said body above said screen and adjacent thereto, a thresher plate having spaced bearings in which the cranks of said crank shafts are journalled, whereby said plate will be swung in a circular path approaching close to the upper face of said screen when the crank shafts are rotated, projections on the lower face of said thresher plate, motion transmission means connecting said crank shafts to rotate in unison, other motion transmission means connecting one of said crank shafts with one of said ground wheels and an upstanding rigid shield at the forward end of said thresher plate.

4. In a device of the character described, a vehicle having a body, an axle carried by said body, ground wheels supporting said axle and body, said body having a guide way in its forward end portion extending rearwardly in the bottom of the body, a beater supported above said guide way for rotation about a horizontal axis, a rearwardly and upwardly inclined supporting plate secured on the bottom of the body at the rearward end of the guideway, a screen extending from the rearward end of the supporting plate rearwardly of the body, said screen being inclined upward toward its rearward end, a pair of spaced transverse crank shafts rotatably supported on said body above said screen and adjacent thereto, a thresher plate having spaced bearings in which the cranks of said crank shafts are journalled, whereby said plate will be swung in a circular path approaching close to the upper face of said screen when the crank shafts are rotated, projections on the lower face of said thresher plate, motion transmission means connecting said crank shafts to rotate in unison, other motion transmission means connecting one of said crank shafts with one of said ground wheels and oppositely inclined tension springs connected to opposite end portions of the thresher plate and preventing play between said thresher plate and said crank shafts.

MILTON B. SAMPLE.